Jan. 6, 1931.  E. C. FURRER  1,788,100
DEVICE FOR INDICATING MARKET QUOTATIONS
Filed Oct. 20, 1924  3 Sheets-Sheet 1

INVENTOR
E. C. Furrer
BY
ATTORNEYS

Jan. 6, 1931.   E. C. FURRER   1,788,100
DEVICE FOR INDICATING MARKET QUOTATIONS
Filed Oct. 20, 1924   3 Sheets-Sheet 2

INVENTOR
E. C. Furrer
BY
ATTORNEYS

Jan. 6, 1931.  E. C. FURRER  1,788,100
DEVICE FOR INDICATING MARKET QUOTATIONS
Filed Oct. 20, 1924  3 Sheets-Sheet 3

INVENTOR
E. C. Furrer
BY
ATTORNEYS

Patented Jan. 6, 1931

1,788,100

UNITED STATES PATENT OFFICE

EMERY C. FURRER, OF CHICAGO, ILLINOIS REISSUED

DEVICE FOR INDICATING MARKET QUOTATIONS

Application filed October 20, 1924. Serial No. 744,793.

My invention relates to improvements in devices for indicating market quotations, and it consists in the combinations, constructions, and arrangements herein described and claimed.

An object of my invention is to provide a device of the type described in which a moving tape is employed which is caused to move across a stationary display board, and upon which stock quotations, and notations pertaining to stocks are imprinted as the tape moves upon the face of the board.

A further object of my invention is to provide a device of the type described by means of which the broker and his clientele may observe at a glance the relative fluctuations in stock values of any predetermined denomination or specie without the necessity of handling a relatively long tape, bearing miscellaneous notations of various stocks side by side, and which easily becomes entangled so as to make it difficult for the observer to quickly ascertain the condition of the market as to some particular stock.

A further object of my invention is to provide a device of the type described which does away with the necessity of a blackboard and employment of men or boys to make notations thereon. With my improved device for indicating market quotations, all persons in the room in which the device is installed may observe the notations thereon just as quickly as communicated from the transmitting station at one time.

A further object of my invention is to provide a device of the type described in which particularly novel means is employed for imprinting the notations on the tape and for moving the tape as the printing is accomplished.

A further object of my invention is to provide a device of the type described that is extremely simple to operate and which does not necessitate the employment of a skilled operator.

A further object of my invention is to provide a device of the type described that is compact in form and which is thoroughly practical for the purpose intended.

Other objects and advantages will appear in the following specification, and the novel features of the invention will be particularly pointed out in the appended claims.

Figure 1:
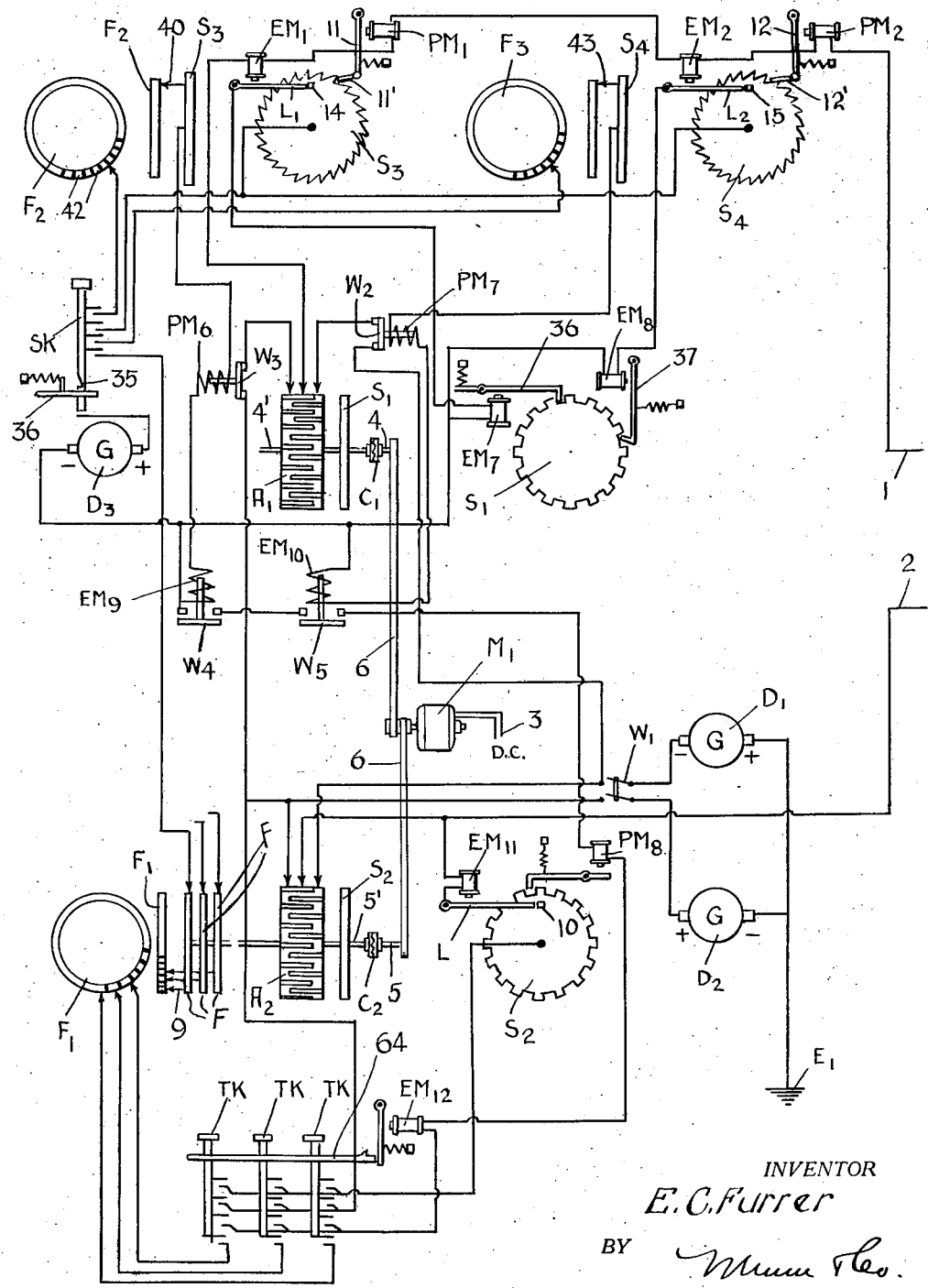
Figure 2:
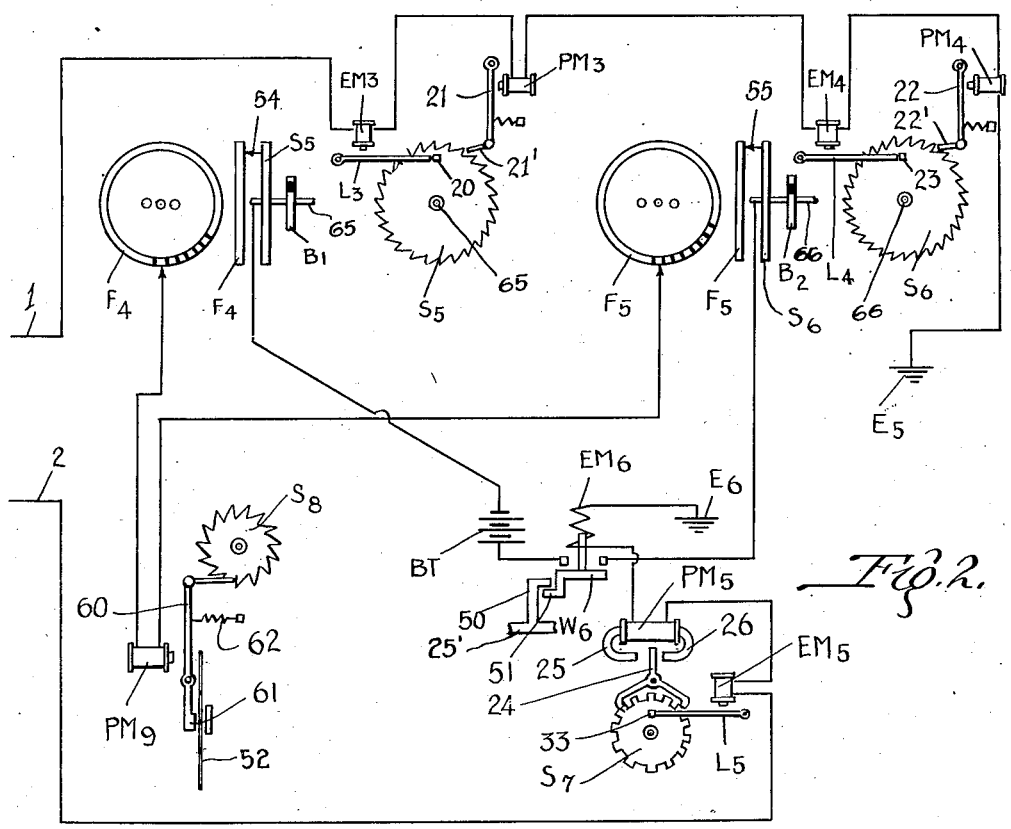
Figure 3:
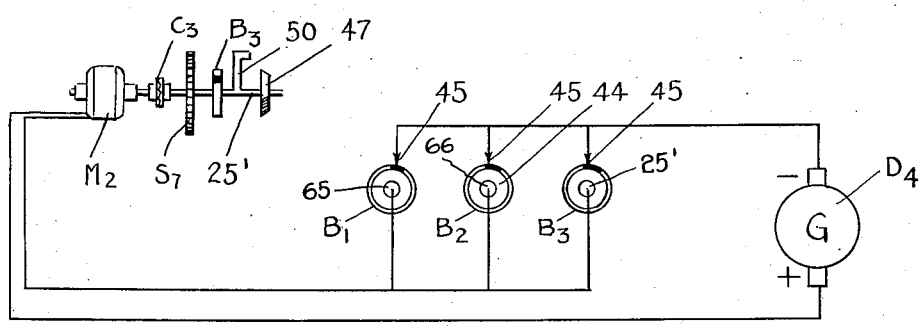
Figure 4:
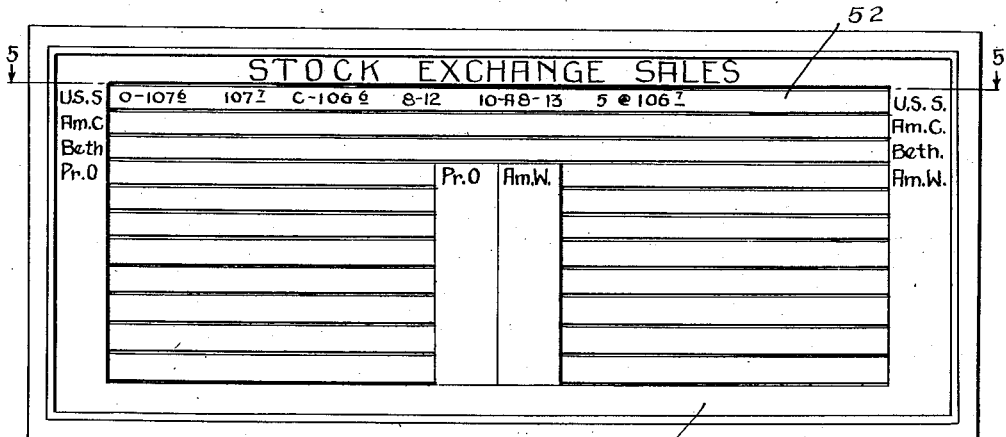
Figure 5:
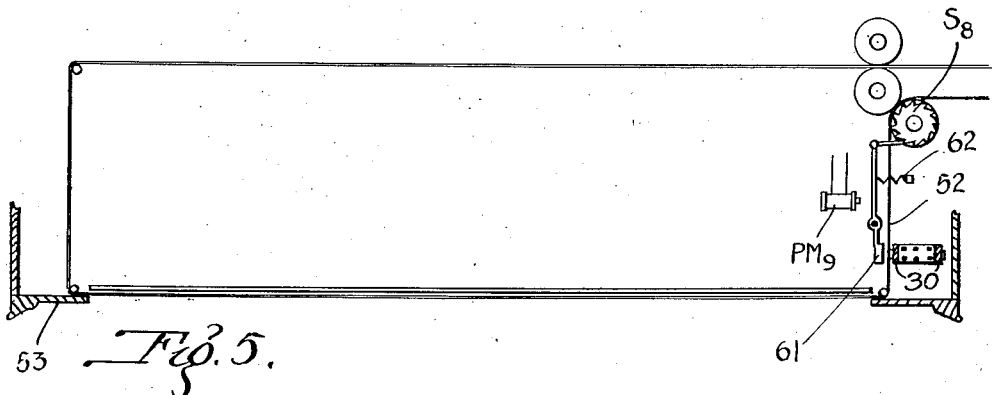
Figure 6:
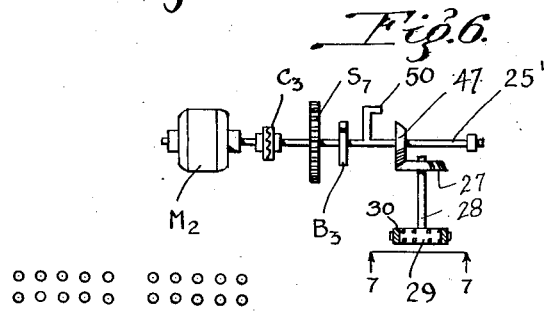
Figure 7:
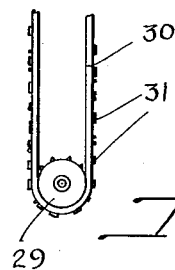
Figure 8:
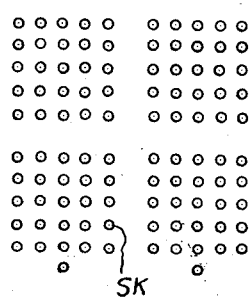

My invention is illustrated in the accompanying drawings forming part of this application, in which Figure 1 is a diagrammatic view showing the electrical circuits employed in the transmitting mechanism, and in diagrammatic form the essential elements of the transmitting apparatus, Figure 2 is a diagrammatic view showing a portion of the electrical circuit for operating the receiving mechanism with the essential instruments of the receiving mechanism shown diagrammatically, Figure 3 is a diagrammatic view showing the electrical connections of a portion of the receiving mechanism associated with the moving tapes, and essential instruments of the mechanism shown diagrammatically, Figure 4 is a front elevation of a stationary display board with the moving tapes in position, Figure 5 is a sectional view along the line 5—5 of Figure 4, Figure 6 is a top plan view of a portion of the tape actuating mechanism with a part of the type chain in section, Figure 7 is a view along the line 7—7 of Figure 6, illustrating the type of chain, and Figure 8 shows a portion of a selector key board.

In carrying out my invention I employ a transmitting apparatus having two distinct circuits which I shall refer to from time to time as the selector circuit and the type circuit. The mechanism in the electrical connections employed in the transmitting apparatus is fully disclosed in Figure 1 and for the purpose of clearness and brevity in description, only the essential mechanical elements are shown.

The transmitting station is located preferably in a central office, as near the stock market or exchange as possible, where an operator, having intimate knowledge of the activity in the market may immediately upon notice of changes in stock values and news of interest to the broker, actuate a keyboard, certain keys of which, for the purpose of illustration, are shown in Figure 1, whereupon electrical impulses are set up, in conducting lines connected with suitable receiving mechanism for the purpose of actuating a moving tape in each of the several receiving stations, and for operating simultaneously printing mechanism for imprinting the message, quotations, and the like, upon the tape. There are two main wires 1 and 2, extending from the central or transmitting station. The third conductor employed is the earth itself, or ground connection. This ground connection is indicated at E1 in the drawing. The receiving instrument (see Figure 2) is controlled through the selector circuit 1 and the type circuit 2. Both circuits carry alternating current with an occasional longer flow in either direction.

The selector circuit rotates the two escapement wheels $S_5$ and $S_6$, each of which carries a brush 54 and 55 in contact with a stationary commutator. A longer flow of current unlocks the wheels. When unlocked, each flow of current in one direction rotates one wheel so its brush moves from one segment to the next of its stationary commutator; each flow of current in the opposite direction rotates the other wheel so its brush moves from segment to segment of its stationary commutator.

The polarized magnet PM9 actuating the platen 61 for each stock tape is connected in a local circuit between a segment of one stationary commutator and a segment of the other; the brushes are connected to opposite terminals of a battery BT. Thus when the switch $W_6$ is closed, a printing platen is going to print upon its tape, and it depends upon what two commutator segments are in contact with the brushes, as to which tape is printed upon.

The type circuit, through an escapement wheel S7 and shafts, controls the movements of the type chain (see Figures 6, 7, and 2). A longer flow of current unlocks the escapement wheel. Alternating current allows the type chain to move step by step until the desired character is opposite the desired tape. Then a longer flow of current throws the switch $W_6$, and the character is printed upon the tape.

The transmitting apparatus is so arranged as to send the required pulses of current over the two main circuits. From generators $D_1$ and $D_2$ (see Figure 1), current is sent alternately in opposite directions, through the revolving commutator A, over the main selector circuit. The commutator may be locked against rotation to allow a longer flow of current. When the desired number of pulses of current has been sent from either generator, a switch is automatically opened to prevent further flow of current from this generator.

In a similar way, current is sent from $D_1$ and $D_2$ through $A_2$ over the type circuit. Polarized magnet $PM_8$ can stop $A_2$ through escapement wheel $S_2$ to allow a longer flow of current. $A_2$ revolves until brush 9 on the left brush wheel F comes into contact with the segment of the stationary commutator $F_1$, which is connected with a depressed type key TK. Then $A_2$ is stopped, and the character represented by the TK key is printed upon the tape represented by, say, the key SK. If it is desired to print this same character upon the next lower tape, then $A_2$ and the type chain would have to revolve one more notch. This aditional rotation is provided for by connecting the SK key, representing the next tape in circuit with the second brush wheel F, whose brush 9 is one notch behind the brush for the first wheel. The third tape's SK key would be connected to the third brush wheel to allow for one additional notch of rotation. In tracing the circuit and the relation of the several elements of the transmitting instruments to one another, I shall describe the operation of the mechanism from the first step in energizing the circuits to the final of the series of impulses which completes a cycle in the operation of the transmitting apparatus.

The operator first starts the motor $M_1$ which is preferably an electric motor deriving current from a source 3. The operation of the motor $M_1$ rotates shafts 4 and 5 by means of friction belts 6.

The shafts 4 and 5 are connected with shafts 4' and 5' respectively, through friction clutches C1 and C2 respectively, so that if the shafts 4' and 5' are not locked by some extraneous means they will rotate. The shaft 4' carries a commutator A 1 thereupon having alternating segments insulated from one another, and each so disposed as to extend over two-thirds of the width of the commutator from alternate sides. An escapement wheel S1 is also fixed to the shaft 4' so as to turn therewith. This escapement wheel S 1 serves to stop or permit rotation of the shaft 4', depending upon the position of its locking means.

The shaft 5' carries a commutator A 2 similar to the commutator A 1 thereupon, and an escapement wheel S 2 similar to the escapement wheel S 1.

Twenty-six brush wheels F are carried by the shaft 5' at the outermost end thereof. Each of the brush wheels F has electrically connected thereto a brush 9, extending laterally from the wheel and having their ends in a common plane. The brush wheels F are insulated from one another and have contact surfaces on the peripheral edges thereof.

Under normal conditions, upon actuation of the motor M 1 the escapement wheel S 2 will be prevented from rotation, and consequently the shaft 5' by means of an electrical lock mechanism generally indicated at L, which consists in a pivotal lever which lines in the path of the laterally extending lug 10 carried by the wheel S 2.

The next step in the operation is that of closing the single pole double throw switch W 1. The closing of the switch W 1 permits current to flow from the direct current generators D 1 and D 2, through four circuits as follows:

Circuit No. 1 — ground $F_1$ — generator $D_1$ — switch $W_1$ — switch $W_2$ — commutator $A_1$ — magnet $EM_1$ — polarized magnet $PM_1$ — magnet $EM_2$ — polarized magnet $PM_2$ — main line 1—

Circuit No. 2—ground $E_1$—generator $D_2$—switch $W_1$—switch $W_3$—commutator $A_1$—magnet $EM_1$—polarized magnet $PM_1$—magnet $E_2$— polarized magnet $PM_2$—main line 1—

Circuit No. 3—ground $E_1$—generator $D_1$—switch $W_1$—commutator $A_2$—main line 2—

Circuit No. 4—ground $E_1$—generator $D_2$—switch $W_1$—commutator $A_2$—main line 2—

It should be noted that the elements PM 1 and PM 2 are polarized magnets, and P M 1 becomes effectively energized only when current from the generator D2 is passing through the circuit of which PM 1 is a part, and that the element PM 2 is a polarized magnet which becomes effectively energized only when current from the generator D 1 is passing through the circuit of which PM 2 is a part.

It should be further noted that current will flow thru the above circuits at that time which the commutators A 1 or A 2 are properly set to conduct current therethrough from the three conducting wires, two of which form a part of each of the circuits.

Circuit No. 1 carries current from the generator D 1 which flows only when the switches W 1 and W 2 are closed, and the two brushes forming a part of the circuit are on the same segment of the commutator A 1.

Circuit No. 2 carries current from the generator D 2 which flows only when the switches W 1 and W 3 are closed, and the two brushes forming a part of that circuit are on the same segment of the commutator A 1.

The switches W 2 and W 3 are normally closed and are opened by the actuation of solenoids hereinafter described.

From A 1 to E 1, circuits No. 1 and 2 flow over the same conductor. The current in circuits No. 1 and 2 flows alternately over this ductor, because the segments of the commutator A 1 alternate. The rate of rotation of the commutator A 1 and the thickness of its segments is arranged so that only enough current will flow in the circuits to cause the polarized electromagnet PM 1 and PM 2 to pull their pivotally mounted armatures 11 and 12 respectively toward the core of the magnets. As described, PM 1 is constructed so that current from the generator D 2 will cause it to attract its armature, and PM 2 is constructed so that current only from the generator D 1 will attract its armature.

A pawl 11' is associated with the armature 11, which serves to rotate an escapement wheel S 3 upon de-energization of the magnet PM 1, i. e., when the escapement wheel S 3 is not locked by the locking lever armature L 1. This lever armature normally lies in the path of a laterally extending lug 14 carried by the escapement wheel S 3. When the electromagnet EM 1 is energized, the arm lever L 1 is drawn upwardly out of the path of the lug 14 and the escapement wheel is free to rotate. S 3 is normally locked in this manner. The armature 12 has a pawl 12' carried thereby which is in engagement with an escapement wheel S 4 identical in construction with the escapement wheel S 3 and having a laterally extending lug 15 similar to the lug 14 of the wheel S 3. A lever armature L 2 is normally in the path of the lug 15 and thus serves to stop rotation of the escapement wheel S 4. When the magnet E M 2 is energized, however, the lever armature is drawn upwardly and the escapement wheel is free to rotate. The escapement wheel S 4 is normally locked against rotation. Referring now to Figure 2, I have shown a portion of the receiving instruments in the electrical circuit employed therein. The receiving instruments consist in an electromagnet E M 3, a lever armature L 3, similar in construction and function to the armatures L 1 and L 2, an escapement wheel S 5, having a laterally extending lug 20 for engaging with the lever armature L 3 when not actuated by its magnet coil, a polarized magnet P M 3, a pivotally mounted armature 21 for the magnet P M 3, and a pawl 21' carried by the armature 21 for actuating the escapement wheel S 5.

The receiving instrument further consists in an electromagnet E M 4, a lever armature L 4, and a polarized magnet P M 4, an escapement wheel S 6, an armature 22 for the magnet P M 4, and a pawl 22', carried by the armature 22. The escapement wheel S 6 also carries a laterally extending lug 23 for engaging with the lever arm L 4. These members are each identical in construction with that portion of the receiving circuit just described, with the exception that the polarized magnet P M 4 is arranged to actuate only when current is flowing from the generator D 1 therethrough, while the magnet P M 3 is constructed to operate only when current is flowing from the generator D 2.

E 5 in Figure 2 represents the ground connection. The magnets P M 4, E M 4, P M 3, and E M 3 are all connected in series respectively. The free terminal of the magnet P M 4 is connected with the ground $E_5$, while the free terminal of the magnet E M 3 is connected through a suitable line connection with the terminal 1 of the transmitting circuit. S 5 and S 6 are normally locked by virtue of the armature levers L 3 and L 4 respectively. The portion of the receiving circuit I have just described is known as the selector circuit. This is one of the two principal parts of the receiving circuit.

The other principal part is known as the type circuit and consists chiefly in an electromagnet E M 5. An electromagnet P M 5 having a substantially horseshoe core with a polarized armature 24 which is permitted to oscillate between the opposite poles 25 and 26 of the magnet P M 5, and solenoid E M 6 is used for the purpose of operating a switch plunger and a ground connection E 6. An escapement wheel S 7 is driven by means of a motor M 2 through a friction clutch C 3. Movement of the escapement wheel occurs only by an actuation of the armature 24, and therefore by energization of the polarized magnet P M 5.

The shaft $25_1$ upon which an escapement wheel S 7 is mounted also carries a bevel gear 47 which is in mesh with a bevel gear 27 disposed upon a shaft 28 carrying a sprocket wheel 29, (see Fig. 6). An endless type chain 30 is arranged to pass over the sprocket wheel 29 and to be driven thereby. The chain 30 has type characters 31 set on the outer wall thereof, representing the twenty-six letters of the alphabet and other useful symbols. The operation of the type chain will be described more fully at a later time.

The escapement wheel S 7 is normally locked by means of a lever armature L 5 resting against a lug 33 on the escapement wheel S 7 similar to the lever armature L 3 associated with the escapement wheel S 5 and the lever L 4 associated with the lever S 6. The magnet E M 5 when energized, moves the lever L 5 out of engagement with the lug 33 and permits the actuation of the wheel S 7 by the motor M 2 when the armature 24 is operated.

Returning now to the transmitting circuit, (see Fig. 1) the circuit referred to is No. 3, which includes the dynamo D 1, and will have current flowing therethrough only when the switch W 1 is closed, and the two brushes forming a part of the circuit are on the same segment of the commutator A 2.

The circuit referred to as No. 4, and including the dynamo D 2 will have current flowing therethrough only when the switch W 1 is closed and the two brushes forming a part of the circuit are on the same segment of the commutator A 2. However, under normal conditions the escapement S 2 is locked by the lever armature L and this stops rotation of the commutator A 2 so that none of the brushes associated therewith and forming a part of the circuits 3 and 4 are on its segments. The rate of rotation of the commutator A 2 is regulated the same as that of A 1.

The next step in the operation of my improved device for indicating market quotations is that of pressing one of the selector keys, let us say the selector key labeled U. S. Steel. Counting from the left, the first vertical row of keys are all connected through the same circuit No. 8, with the first segment of $F_3$, counting from the locked position of brush 43. The second row of keys is in circuit with the second segment of $F_3$, the third row with the third segment, etc.

Counting from the top, the first horizontal row of keys are all connected through the same circuit No. 7 with the first segment of $F_2$, counting from the locked position of brush 40. The second row of keys is in circuit with the second segment, the third with the third segment, etc.

It will be obvious that the keyboard could be changed so there would be one key for each segment of $F_3$ and one for each segment of $F_2$, but in this case two keys would have to be depressed, one to control $F_3$ and one to control $F_2$, instead of one as in the case shown. For the purpose of illustration we will assume that the selector key marked S K in Figure 1 is that key. When any key on the selector keyboard, of which there are just as many as there are strips on the display board hereinafter described, is pressed, it is locked against further movement by means of a notched portion 35 therein which engages with the sliding spring pressed lock plate 36. When the lock plate 36 is moved to the left as shown in Fig. 1, the key may be released. Pressing any of the keys on the selector keyboard of which S K is one, current is permitted to flow through the four different circuits as follows:

Circuit No. 5—generator $D_3$—selector key SK—escapement wheel $S_3$—armature $L_1$—magnet $EM_7$—generator $D_3$—

Circuit No. 6—generator $D_3$—selector key SK—escapement wheel $S_4$—armature $L_2$—magnet $EM_8$—generator $D_3$—

Circuit No. 7—generator $D_3$—selector key SK—stationary commutator $F_2$—escapement wheel $S_3$—polarized magnet $PM_6$—magnet $EM_9$—generator $D_3$—

Circuit No. 8—generator $D_3$—selector key SK—stationary commutator $F_3$—escapement wheel $S_4$—polarized magnet $PM_7$—magnet EM 10—generator $D_3$—

P M 7 and E M 8, P M 6, E M 7, E M 9, and E M 10 are solenoid magnets. P M 6 and P M 7 are polarized electromagnets and operate only when current is flowing in one direction therethrough. These solenoids are employed for the purpose of lifting plungers associated therewith upon which a switch blade is mounted.

Circuit No. 5 carries current from the generator D 3, which flows only when S 3 is locked by L 1, and an S K key is pressed. This current causes electromagnet E M 7 through its associate lever armature 36 to stop rotation of the escapement wheel S 1 at such a point that the commutator A 1 which is carried by the same shaft as the escapement wheel, is in a position to allow current to flow from the generator D 2 through the circuit No. 2, heretofore described. Current flows through the circuit No. 2 until electromagnet E M 1 pulls the lever armature L 1 and unlocks the escapement wheel S 3. This breaks circuit No. 5 at L 1 and thus releases S 1. When the electromagnet E M 1 pulls the lever armature L 1, electromagnet E M 2 should pull the lever armature L 2 and unlock the escapement wheels S 4.

Circuit No. 6 carries current from the generator D 3 which flows only when the escapement wheel S 4 is locked by the lever armature L 2 and an S K key is pressed. This current causes electromagnet E M 8 through its associate lever armature 37, to stop rotation of the escapement wheel S 1 at such a point that the commutator A 1 is in a position to allow current from the generator D 1 to flow through circuit No. 1. Current flows through the circuit No. 1 until the electromagnet E M 2 pulls the lever armature L 2 and unlocks the escapement wheel S 4. This breaks circuit No. 6 at L 2 and thus releases S 1. When the electromagnet E M 2 pulls the lever armature L 2, the electromagnet E M 1 should pull lever armature L 1 and unlock the escapement wheel S 3.

This double provision for unlocking the escapement wheels S 3 and S 4 is made because frequently one will be locked when the other is not, and current cannot flow through one lock to unlock the other, which is locked.

The flow of current that must pass through circuits Nos. 1 and 2 to unlock the escapement wheels S 3 and S 4 passes on to the selector circuit heretofore described of the receiving instruments. This current unlocks the escapement wheel S 5 by operation of the electromagnets E M 3 and L 3 and unlocks the escapement wheel S 6 through the electromagnet E M 4 and the lever armature L 4. In this manner the escapement wheels S 3 and S 5 are unlocked so that they can rotate in unison with each impulse or momentary flow of current from the generator D 2. The escapement wheels S 4 and S 6 are unlocked so that they may rotate in unison with each impulse or momentary flow of current from the generator D 1.

Circuit No. 7 carries current from the generator D 3 which flows only when one of the S K keys is pressed, and a brush 40 in this circuit carried by the escapement wheel S 3 is on one of the segments 42 of a stationary commutator F 2, which segment is connected with the key S K which is pressed. There is one segment for each horizontal row of S K keys. Let us assume that the U. S. Steel key S K is in the ninth horizontal row from the top. In the present installation, we will assume that each horizontal row of the keys is connected with a segment of the commutator F 2, there being twenty segments and twenty rows.

When the escapement wheel S 3 rotates from a locked position to the ninth segment of the stationary commutator F 2, current will flow through the circuit No. 7. This current will cause the polarized magnet P M 6 to open the switch W 3 and also cause the electromagnet E M 9 to close a switch W 4. The switch W 4 is normally open. Upon opening the switch W 3, circuit No. 2 is broken and thus stops the momentary pulsating flow of current from the generator D 2 in this circuit. This stops rotation of the escapement wheels S 3 and S 5 upon the ninth segment of the stationary commutator F 2, and of the stationary commutator F 4, similar in construction to the commutator F 3 of the receiving instrument.

Circuit No. 8 carries current from the generator D 3 only when an S K key is pressed, and the brush 43 forming a part of that circuit is upon the segment of a stationary commutator F 3, similar to the commutator F 2, which is connected with the key S K that is depressed. The key for U. S. Steel which we shall assume is pressed, and which is shown in Figure 1, is in the fifth vertical row from the left side. Each vertical row of keys is connected with a segment of the stationary commutator F 3, there being twenty segments and twenty vertical rows. When the escapement wheel S 4 rotates from a locked position to the fifth segment of the stationary commutator F 3, current may flow through circuit No. 8. This current causes the polarized magnet P M 7 to open the switch W 2 and also causes the electromagnet E M 10 to close a switch W 5 similar to the switch W 4. The switch W 5 is normally open.

Opening of the switch W 2 breaks circuit No. 1 and thus stops the pulsating current from the generator D 1 in the circuit. This stops the escapement wheels S 4 and S 6 respectively upon the fifth segment of their associate stationary commutators F 3 and F 5, (see Figure 2). F 5 is a commutator similar in construction to the commutator F 4.

The selector parts of the sending instrument and the receiving instrument are now in a position for printing upon the tape for U. S. Steel, common.

Referring to the receiving instrument, it will be noted that in Figure 3 I have shown three conductor bands, B 1, B 2, and B 3, which are mounted upon the same shafts with the escapement wheels S 5, S 6, and S 7 respectively, see Figures 2 and 3. These conductor bands, which form a part of a motor circuit, extend substantially 300° upon the peripheral wall of drum-shaped members 44. The remaining 60° of the peripheral wall is of insulating material, so that brushes 45, which are arranged to bear upon the peripheral wall, will contact with the band for 300° and will bear upon insulation during the remaining 60° during rotation of the bands. Current for the motor circuit is provided in a generator D 4. This circuit consists in an electromotor M 2 and three bands B 1, B 2, and B 3 in parallel, so that rotation of any one of the bands B 1, B 2, or B 3 to contact with their associated brushes 45, will close the circuit and cause rotation of the motor M 2.

The bands B 1, B 2, and B 3 are so mounted with respect to their associated escapement wheels S 5, S 6, and S 7, as to lie with the insulation thereof in engagement with their associate brushes when the escapement wheels are locked by their lever armatures L 3, L 4, and L 5 respectively. When either $S_5$ or $S_6$ is unlocked, as explained above, and starts rotating, current flows from $D_4$ through $B_1$ or $B_2$ and rotates the motor $M_2$. The friction clutch $C_3$ is disposed between the motor M 2 and the escapement wheel S 7, which is mounted upon the shaft 47. The clutch $C_3$ permits the motor $M_3$ to rotate without turning the shaft 25. The escapement wheel $S_7$ is usually locked and thus prevents rotation of the tape through the gears 26 and 47 (see Figure 6) until it is unlocked, as explained later. When both $S_5$ and $S_6$ have returned to locked positions, current for $M_2$ cannot flow through $B_1$ or $B_2$. It will be observed that $B_3$ is placed upon the shaft 25 with its insulation opposite the locked position of $S_7$ so current can flow through it until $S_7$ returns to its locked position.

The next step in the operation of my improved device for indicating market quotations is that of pressing one of the type keys on the type keyboard, three of which are shown and labeled T K in Figure 1. When any key on a type keyboard is pressed, it is locked and remains pressed until after the printing mechanism hereinafter described is operated, by any well known locking device.

Pressing any key on the type keyboard allows current to flow through two circuits as follows:

Circuit No. 9—ground $E_1$—generator $D_2$—switch $W_1$—type key TK—escapement wheel $S_2$—armature L—magnet $EM_{11}$—main line 2—

Circuit No. 10—generator $D_3$—selector key SK—brush wheel F—stationary commutator $F_1$—type key TK—magnet $EM_{12}$— polarized magnet $PM_8$—switch $W_5$—switch $W_4$—generator $D_3$—.

Circuit No. 9 carries current from the generator D 2 which flows only when a T K key is pressed, the switch W 1 is closed, and the escapement wheel S 2 locked by its lever armature L. This current causes an electromagnet E M 11 to pull the lever armature L and thus unlock the escapement wheel S 2. This stops the flow of current in circuit No. 9. The flow of current in circuit No. 9 is transmitted through the type line or line 2 to the type circuit of the receiving instruments, where it causes the electromagnet E M 5 to pull the lever armature L 5 and thus unlock the escapement wheel S 7.

The electromagnet E M 6 cannot close the switch W 6 because of the radially extending stop member 50, carried by the shaft 47, which engages with a depending hook-shaped member 51 associated with the switch blade W 6. In this way the escapement wheels S 2 and S 7 are unlocked and start rotating in unison, current flowing in circuit No. 3, and circuit No. 4 alternately by virtue of the rotation of the commutator A 1.

Circuit No. 10 carries current from the dynamo D 3 which flows only when an S K key and a T K key are pressed, and F 1 has rotated so that the conductor from the pressed S K key is connected through F 1 with a conductor to the pressed T K key, and switches W 4 and W 5 are closed.

With reference to Figure 4, it will be noted that the U. S. Steel tape is at the top of the board and that tapes for various other stocks are disposed in horizontal rows across the board. The U. S. Steel tape is indicated at 52 of the board 53.

When the escapement wheel S 7 is locked, the character 1 of the type chain 30 is opposite U. S. Steel tape, (see Fig. 5). There are twenty-six characters and spaces upon the type chain 30 so that if S 7 rotates twenty-two notches, i. e., so as to cause the type chain 30 to move twenty-two characters, the character 5 will be opposite U. S. Steel, and current can also flow through circuit 10.

If it were desired to print "5" upon the American Can tape, which is below the U. S. Steel tape, the escapement wheel 7 would have to rotate twenty-three notches. All tapes in the same relative positions to the characters upon the type chain 30, as U. S. Steel is to the type chain, are in position 1, and their S K keys are connected with the same brush on F 1.

The American Can tape is in the second position and its S K key is connected to the second brush on F 1. The flow of current in the circuit 10 causes the polarized magnet P M 8 to pull its armature and stop the escapement wheel S 2. The escapement wheel S 2 stops so that the commutator A 2 allows a longer flow of current over the circuits 3 or 4, depending upon the position of the commutator A 2. This current is conducted to the type circuit through the line 2 and the ground, and causes electromagnets E M 6 to close the switch W 6 in the local circuit.

This local circuit consists in the following:
Battery B T—switch W₆—escapement wheel S 6—stationary commutator F₅—polarized magnet P M₉—stationary commutator F₄—escapement wheel S 5—battery B T—.

Current in the local circuit flows only when the switch W 6 is closed and the brushes 54 and 55 of the escapement wheels S 5 and S 6 respectively are upon the conductor segments of their stationary conductors F 4 and F 5 respectively. The flow of current in the local circuit causes the polarized magnet P M 9 for U. S. Steel to attract its armature 60 upon which a platen 61 is mounted to print 5 upon the U. S. Steel tape 52.

When P M 9 releases its armature 60, the spring 62 rotates the roller S 8 one space, so that the tape is ready for the next character to be printed.

There is a polarized magnet PM₉ for each tape upon the board. These magnets are all connected in parallel in the local circuit between F₅ and F₄. They are connected in such a way that between any one segment of F₅ and any one segment of F₄ there is only one magnet PM₉. Thus the combination in the local circuit of any particular segment of F₅ and any particular segment of F₄ determines the tape to be printed upon.

Circuit No. 10 causes E M 12 to attract its armature 64, thus releasing T K key 5. This shows to the transmitting operator that 5 has been printed upon the U. S. Steel tape.

When the operator presses T K keys @ 1 0 6 7 *space*, one after the other is released. These characters are printed upon the tape in the same manner that the character "5" is printed.

If no further keys are pressed, the escapement wheels S 2 and S 7 rotate to locked position.

The next operation is that of pressing the release strap 36 of the selector keyboard.

The release strap releases U. S. Steel key S K which breaks circuits 5, 6, 7, 8, and 10. Breaking circuits 7 and 8 allows switches W 3 and W 2 to close, and W 4 and W 5 to open. Closing switches W 3 and W 2 allows current to flow through circuits 1 and 2. This permits the whole system to go back to its normal position. The operator next opens switch W 1 and then stops the motor M 1.

I claim:

1. In a device for indicating market quotations, a transmitting station, a remote receiving station, a selector keyboard at said transmitting station, a plurality of tapes at said receiving station, a selector mechanism comprising selector elements at the transmitting and at the receiving station, means for actuating said selector elements to operate in synchronism, said last-named means being actuated by the depression of a key on the selector keyboard, whereby one of the tapes at the receiving station is selected, a printing mechanism at the receiving station for printing a selected tape, and a type-selecting keyboard at said transmitting station for selecting the type and for actuating the printing mechanism.

2. In a device for indicating market quotations, a transmitting station, a remote receiving station, a selector keyboard at said transmitting station, a plurality of tapes at said receiving station, a selector mechanism comprising normally locked selector elements at the transmitting and at the receiving station, means for unlocking and advancing said selector elements to operate in synchronism, said last-named means being actuated by the depression of a key on the selector keyboard, whereby one of the tapes at the receiving station is selected, a printing mechanism at the receiving station for printing a selected tape, and a type-selecting keyboard at said transmitting station for selecting the type and for actuating the printing mechanism.

3. In a device for indicating market quotations, a transmitting station, a remote receiving station, a selector keyboard at said transmitting station, a plurality of tapes at said receiving station, a selector mechanism comprising normally locked selector elements at the transmitting and at the receiving station, means for unlocking, advancing and stopping said selector elements to operate in synchronism, said last-named means being actuated by the depression of a key on the selector keyboard, whereby one of the tapes at the receiving station is selected, a printing mechanism at the receiving station for printing a selected tape, and a type-selecting keyboard at said transmitting station for selecting the type and for actuating the printing mechanism.

EMERY C. FURRER.